US 12,192,946 B2

(12) United States Patent
Wu et al.

(10) Patent No.: US 12,192,946 B2
(45) Date of Patent: Jan. 7, 2025

(54) METHOD AND APPARATUS FOR CORE NETWORK REGISTRATION AND RADIO ACCESS NETWORK NOTIFICATION UPDATE

(71) Applicant: LENOVO (BEIJING) LIMITED, Beijing (CN)

(72) Inventors: Lianhai Wu, Beijing (CN); Haiming Wang, Beijing (CN); Jing Han, Beijing (CN); Zhi Yan, Beijing (CN); Jie Shi, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 311 days.

(21) Appl. No.: 17/637,300

(22) PCT Filed: Aug. 23, 2019

(86) PCT No.: PCT/CN2019/102340
§ 371 (c)(1),
(2) Date: Feb. 22, 2022

(87) PCT Pub. No.: WO2021/035439
PCT Pub. Date: Mar. 4, 2021

(65) Prior Publication Data
US 2022/0286995 A1    Sep. 8, 2022

(51) Int. Cl.
*H04W 60/04* (2009.01)
*H04L 1/00* (2006.01)
(Continued)

(52) U.S. Cl.
CPC ........... *H04W 60/04* (2013.01); *H04L 1/0025* (2013.01); *H04W 76/19* (2018.02); *H04W 76/20* (2018.02)

(58) Field of Classification Search
None
See application file for complete search history.

(56) References Cited

U.S. PATENT DOCUMENTS

2003/0008647 A1    1/2003   Takatori et al.
2007/0111751 A1*   5/2007   Iimori ............... H04W 52/0225
                                                            455/434
(Continued)

FOREIGN PATENT DOCUMENTS

CN    103501528 A    1/2014
CN    105307234 A    2/2016
(Continued)

OTHER PUBLICATIONS

International Searching Authority, "Written Opinion of the International Searching Authority," PCT/CN2019/102340, Apr. 27, 2020, pp. 1-5.

*Primary Examiner* — Andre Tacdiran
(74) *Attorney, Agent, or Firm* — Kunzler Bean & Adamson

(57) ABSTRACT

The present disclosure relates to methods and apparatuses. According to some embodiments of the disclosure, a method includes: receiving, at a first communication device from a second communication device, first registration information of a last serving cell, the first registration information at least including a first tracking area code and the identity of the second communication device; and determining whether to perform a registration procedure for the second communication device based on the first registration information.

15 Claims, 14 Drawing Sheets

(51) Int. Cl.
*H04W 76/19* (2018.01)
*H04W 76/20* (2018.01)

(56) References Cited

U.S. PATENT DOCUMENTS

| | | |
|---|---|---|
| 2012/0315903 A1 | 12/2012 | Yoshimura et al. |
| 2014/0092871 A1* | 4/2014 | Wang .................... H04W 60/04 370/331 |
| 2015/0050956 A1 | 2/2015 | Itaya et al. |
| 2015/0099509 A1* | 4/2015 | Mahmood ............. H04W 36/14 455/425 |
| 2018/0220350 A1 | 8/2018 | Ingale et al. |
| 2019/0090198 A1 | 3/2019 | Zhao |
| 2019/0230556 A1* | 7/2019 | Lee ....................... H04W 28/16 |
| 2019/0239147 A1* | 8/2019 | Chun .................... H04W 88/06 |
| 2019/0268874 A1* | 8/2019 | Ravishankar ......... H04W 4/029 |
| 2020/0015192 A1* | 1/2020 | Chun .................... H04W 76/27 |
| 2020/0053821 A1* | 2/2020 | Shih ...................... H04W 76/27 |

FOREIGN PATENT DOCUMENTS

| | | |
|---|---|---|
| CN | 108322926 A | 7/2018 |
| EP | 3370473 A1 | 9/2018 |
| EP | 3459275 B1 | 2/2020 |

\* cited by examiner

METHOD AND APPARATUS FOR CORE NETWORK REGISTRATION AND RADIO ACCESS NETWORK NOTIFICATION UPDATE

TECHNICAL FIELD

The present disclosure generally relates to wireless communication technology, and more particularly to core network registration and radio access network notification update in a wireless communication system.

BACKGROUND

Wireless communication systems are widely deployed to provide various telecommunication services such as telephony, video, data, messaging, and broadcasts. Wireless communication systems may employ multiple access technologies capable of supporting communication with multiple users by sharing available system resources.

In a wireless communication system, a communication device (e.g., User Equipment (UE)) may be out of network coverage, and thus may not be able to communicate with the network. However, a communication device that is out of network coverage may still want to communicate with the network to receive services. Similarly, a communication device, which may be within or out of network coverage, but is incapable of communicating with a BS, may also want to communicate with the network to receive services.

There is a need for handling communications between a remote or incapable communication device and the network or the BS in a wireless communication system.

SUMMARY OF THE DISCLOSURE

An embodiment of the present disclosure provides a method. The method may include receiving, at a first communication device from a second communication device, first registration information of a last serving cell, the first registration information at least including a first tracking area code and the identity of the second communication device; and determining whether to perform a registration procedure for the second communication device based on the first registration information.

In an embodiment of the present application, the method may include transmitting a message to a base station when the first tracking area code is different from a second tracking area code of a serving cell of the first communication device, wherein the message may include the identity of at least one child communication device of the first communication device, and the at least one child communication device is in an idle mode. The at least one child communication device may include the second communication device, and the message may include the identity of the second communication device.

In an embodiment of the present application, the method may include when the first tracking area code is different from a second tracking area code of a serving cell of the first communication device, transmitting the second tracking area code to the second communication device.

Another embodiment of the present disclosure provides a method. The method may include receiving, at a first communication device from a second communication device, first Radio Access Network (RAN) based notification area information of a last serving cell and an identity of the second communication device; and determining whether to perform a RAN based notification area update procedure for the second communication device based on the first RAN based notification area information. The identity of the second communication device may include a resume ID.

In an embodiment of the present application, the method may include transmitting a message to a base station when the first RAN based notification area information does not match a second RAN based notification area information of a serving cell of the first communication device, wherein the message may include the identity of at least one child communication device of the first communication device, and the at least one child communication device is in an inactive mode. In an embodiment of the present application, the at least one child communication device may include the second communication device, and the message may include the identity of the second communication device. In an embodiment of the present application, the first RAN based notification area information may indicate at least one cell, and when the at least one cell does not include the serving cell of the first communication device, the first RAN based notification area information does not match a second RAN based notification area information. In an embodiment of the present application, the first RAN based notification area information may indicate at least one RAN area, and when the at least one RAN area does not include the serving cell of the first communication device, the first RAN based notification area information does not match a second RAN based notification area information.

In an embodiment of the present application, the method may include when the first RAN based notification area information is different from the second RAN based notification area information of a serving cell of the first communication device, transmitting the second RAN based notification area information to the second communication device.

Yet another embodiment of the present disclosure provides a method. The method may include transmitting a message to a base station when a trigger condition is met, wherein the trigger condition is a change in the number of child communication devices of a first communication device.

In an embodiment of the present application, the trigger condition may be a change in the number of idle child communication devices of the first communication device. The message may include registration information, the registration information at least including the identity of at least one idle child communication device of the first communication device.

In an embodiment of the present application, the trigger condition may be the trigger condition is a change in the number of inactive child communication devices of the first communication device. The message may include Radio Access Network (RAN) notification information, the RAN notification information at least including the identity of at least one inactive child communication device of the first communication device.

Yet another embodiment of the present disclosure provides a method. The method may include receiving timer information from a child communication device at a first communication device, wherein the timer information may include a time interval of a first periodic timer and an amount of elapsed time of the first periodic timer; starting a second timer at the first communication device according to the timer information; and transmitting a message at the first communication device in response to an expiry of the second timer.

In an embodiment of the present application, the child communication device may be in an idle mode, and the message may include registration information, the registration information at least including the identity of at least one idle child communication device of the first communication device. The first periodic timer may correspond to a periodic registration timer.

In an embodiment of the present application, the child communication device may be in an inactive mode, and the message may include Radio Access Network (RAN) notification information, the RAN notification information at least including the identity of at least one inactive child communication device of the first communication device. The first periodic timer may correspond to a periodic RAN notification area update timer.

In an embodiment of the present application, the second timer may have a time duration equal to the time interval of the first periodic timer minus the amount of elapsed time of the first periodic timer.

In an embodiment of the present application, the method may include starting a third periodic timer in response to the expiry of the second timer, wherein the third periodic timer has a time interval equal to the time interval of the first periodic timer.

Yet another embodiment of the present disclosure provides a method. The method may include receiving timer information from at least one child communication device at a first communication device, wherein the timer information may include at least one time interval, each of the at least one time interval corresponds to a respective first periodic timer at a corresponding child communication device of the at least one child communication device; starting a second periodic timer at the first communication device according to the timer information; and transmitting a message at the first communication device in response to an expiry of the second periodic timer. The second periodic timer may have a time interval equal to a minimum value of the at least one time interval.

In an embodiment of the present application, the first periodic timer may correspond to a periodic registration timer. The message may include the identity of at least one child communication device of the first communication device. The at least one child communication device may be in an idle mode.

In an embodiment of the present application, the first periodic timer may correspond to a periodic Radio Access Network (RAN) notification area update timer. The message may include the identity of at least one child communication device of the first communication device. The at least one child communication device may be in an inactive mode.

Yet another embodiment of the present disclosure provides a method. The method may include receiving a configuration message from a base station at a first communication device. The configuration message may indicate a timer interval of a period timer for at least one child communication device of the first communication device.

In an embodiment of the present application, the periodic timer may correspond to a periodic registration timer. The method may include transmitting a message to a base station, wherein the message may include the identity of the at least one child communication device of the first communication device, and the at least one child communication device is in an idle mode.

In an embodiment of the present application, the periodic timer may correspond to a periodic Radio Access Network (RAN) notification area update timer. The method may include transmitting a message to a base station, wherein the message may include the identity of the at least one child communication device of the first communication device, and the at least one child communication device may be in an inactive mode.

Yet another embodiment of the present disclosure provides a method. The method may include storing first registration information of a last serving cell; receiving, from a first communication device, a message including second registration information of a serving cell of the first communication device; and determining whether to perform a registration procedure based on the first registration information and the second registration information. The method may include performing a registration procedure when the second registration information does not match the first registration information. The first registration information may indicate a first tracking area code of the last serving cell, and the second registration information may indicate a second tracking area code of the serving cell of the first communication device.

Yet another embodiment of the present disclosure provides a method. The method may include storing first Radio Access Network (RAN) based notification area information of a last serving cell; receiving, from a first communication device, a message including a serving cell ID and second RAN based notification area information of a serving cell of the first communication device; and determining whether to perform a RAN based notification area update procedure based on the first RAN based notification area information and the serving cell ID. The method may include performing a RAN based notification area update procedure when the serving cell ID is not included in the first RAN based notification area information. The first RAN based notification area information may indicate at least one cell or at least one RAN area, and the second RAN based notification area information may indicate at least one cell or at least one RAN area.

Yet another embodiment of the present disclosure provides an apparatus. According to some embodiments of the present disclosure, the apparatus includes: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, to cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Figure 1:
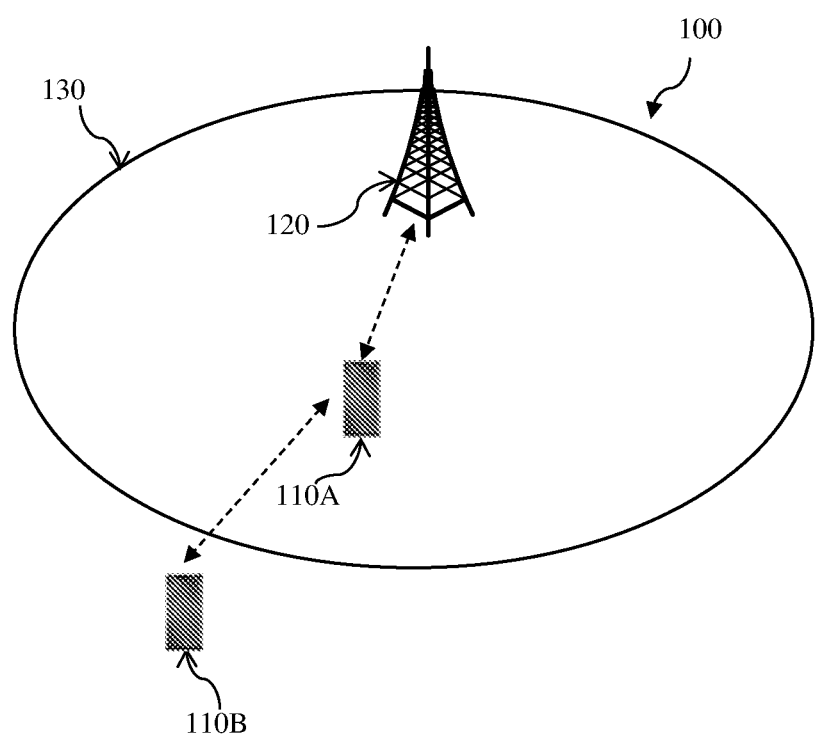
FIG. 1 illustrates a schematic wireless communication system according to some embodiments of the present disclosure.

FIG. 1 illustrates a schematic wireless communication system 100 according to some embodiments of the present disclosure.

Referring to FIG. 1, a wireless communication system 100 may include a base station (e.g., BS 120) and some UEs (e.g., UE 110A and UE 110B). Although, for simplicity, merely one BS 120 and two UEs are illustrated in FIG. 1, it is contemplated that wireless communication system 100 may also include more BSs 120 and more or fewer UEs in and outside of the coverage of the BSs 120 in some other embodiments of the present disclosure.

The UEs and the base station may support communication based on, for example, 3G, Long-Term Evolution (LTE), LTE-Advanced (LTE-A), New Radio (NR), or other suitable protocol(s). For example, the BS 120 may include an eNB or a gNB. The UE 110A may include, for example, but is not limited to, a computing device, a wearable device, a mobile device, an IoT device, etc. The UE 110B may include a device that is the same or similar to the UE 110A. The UE 110B may also include a device different from the UE 110A. Persons skilled in the art should understand that as technology develops and advances, the terminologies described in the present disclosure may change, but should not affect or limit the principles and spirit of the present disclosure.

According to the 3rd Generation Partnership Project (3GPP), a UE (e.g., UE 110A or UE 110B) may be in one of the following state: RRC-IDLE state, RRC_CONNECTED state, and RRC_INACTIVE state, at a given time. In RRC_INACTIVE state, a UE does not have an RRC connection with the Radio Access Network (RAN, e.g., BS 120). However, the RAN keeps a connection with the core network for the UE. Therefore, RRC_INACTIVE state may achieve power saving with acceptable access latency. The specific characteristics of RRC-IDLE state, RRC_CONNECTED state, and RRC_INACTIVE state are defined in 3GPP specifications. The UE 110A and UE 110B may be in an idle mode corresponding to the RRC_IDLE state, an inactive mode corresponding to the RRC_INACTIVE state, or a connected mode corresponding to the RRC_CONNECTED state.

The BS 120 may communicate with a Core Network (CN) (not shown in FIG. 1), and may operate or work under the control of an Access and Mobility Management Function (AMF) (not shown in FIG. 1), which functions as a part of the core network. The BS 120 may define one or more cells, and each cell may have a coverage area 130. In the exemplary wireless communication system 100, UE 110A is within the coverage of the BS 120 (i.e., in-coverage), and UE 110B is outside the coverage of the BS 120 (i.e., out-of-coverage).

Although FIG. 1 shows that the UE 110B is outside of the coverage of the BS 120 for simplicity, it is contemplated that the UE 110B may also be within the coverage of the BS 120 in some other embodiments of the present disclosure.

The UE 110B may want to communicate with the network to receive services. However, UE 110B may not be able to communicate with the network because, for example, it is outside the coverage of the base station or it is incapable of communicating with the base station. One of some solutions to resolve the above problem is to relay via another UE which is located within the coverage of the base station or in communication with the base station. For example, UE 110B may access the BS 120 via the UE 110A. In this case, UE 110A may act as a relay node relaying messages and data between UE 110B and BS 120 (or the core network). The UE 110A may be referred to as a relay UE, and the UE 110B may be referred to as a remote UE or a child node of the UE 110A.

More details on the procedure of handling communications between a remote UE, a relay UE, and the network or the BS will be described in detail in the following text in combination with the appended drawings.

In a wireless communication system, a communication device may need to register with a network to receive services. A communication device may also need to register its presence in a registration area periodically or when entering a new tracking area. A registration Area is an area in which a communication device may roam without a need to perform location registration, which is a Non-Access Stratum (NAS) procedure. In other words, the communication device may initiate a network registration procedure under, but is not limited to, one of the following conditions:

initial registration with the wireless communication system (e.g., when the communication device is powered up);

upon a change in the registration area (e.g., when the communication device moves to a new Tracking Area (TA) outside the communication device's original registration area); or periodic registration update (e.g., due to a predefined time period of inactivity).

The above three conditions may be referred to as initial registration, registration area update, and periodic registration update, respectively.

Figure 2:
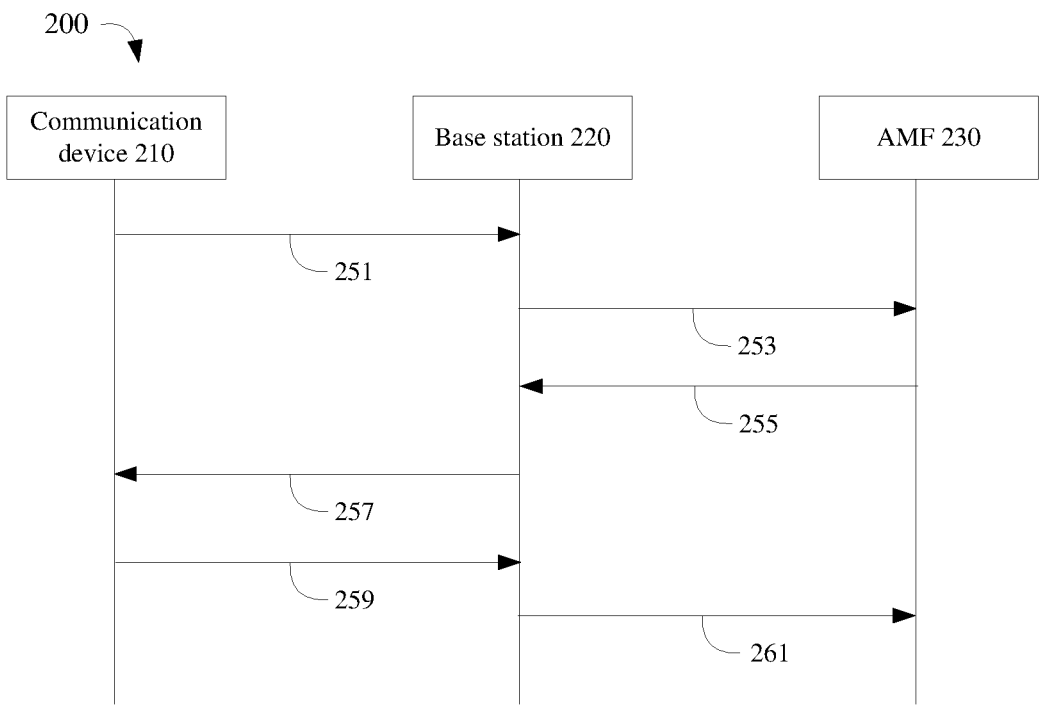
FIG. 2 illustrates a flow chart of an exemplary procedure of performing network registration according to some embodiments of the present disclosure.

FIG. 2 illustrates a flow chart of an exemplary procedure 200 of performing core network registration for a communication device according to some embodiments of the present disclosure. The exemplary procedure 200 is applicable to the above three types of registration, i.e., initial registration, registration area update, and periodic registration update, and other types of registration.

The exemplary procedure 200 shows a procedure of a communication device (e.g., communication device 210) communicating with a base station (e.g., BS 220), which operates under the control of a core network entity (e.g., AMF 230). In some examples, the communication device 210 may function as the communication device 110A or the communication device 110B in FIG. 1. The BS 220 may function as the BS 120 in FIG. 1.

Referring to FIG. 2, in operation 251, the communication device 210 may transmit a registration request message to the BS 220. The registration request message may include a registration type. The registration type may indicate whether the communication device 210 intends to perform an initial registration, a registration area update, a periodic registration update, or other types of registration. The registration request message may include the identity of the communication device 210.

In operation 253, the BS 220 may transfer the registration request message to the AMF 230. The registration request message may include the identity of the communication device 210. After receiving the registration request message from the BS 220, the AMF 230 may transmit, in operation 255, a registration accept message to the BS 220. The registration accept message may indicate that the registration request of the communication device has been accepted. The registration accept message may include the identity of the communication device 210.

In some embodiments of the present disclosure, the registration accept message may include registration information. In some embodiments, the registration information may indicate at least one registration area (e.g., tracking area) in which the serving cell (e.g., the BS 220) is located. A tracking area may be identified by a Tracking Area Code (TAC).

In some embodiments of the present disclosure, the registration accept message may not indicate the registration area or the tracking area, which may suggest that a last registration area allocated to the communication device is still valid. In other words, the communication device is within the last registration area.

In operation 257, the BS 220 may transfer the registration accept message to the communication device 210. In operation 259, the communication device 210 may transmit a registration complete message to the BS 220. The registration complete message may include the identity of the communication device 210. In operation 261, the BS 220 may transmit the registration complete message to the AMF 230. The specific definitions of the above messages are defined in 3GPP specification TS 23.502.

It should be appreciated by persons skilled in the art that some of the operations in exemplary procedures 200 may be eliminated, without departing from the spirit and scope of the disclosure.

A communication device (child communication device) accessing a network via another communication device (relay communication device) may also need to register with the network. In some embodiments of the present disclosure, the child communication device itself may perform a registration procedure similar to the exemplary procedure 200. In some other embodiments of the present disclosure, the relay communication device may perform such registration procedure on behalf of the child communication device. The procedure of performing network registration for a child communication device will be described in detail in the following text in combination with the appended drawings.

Figure 3A:
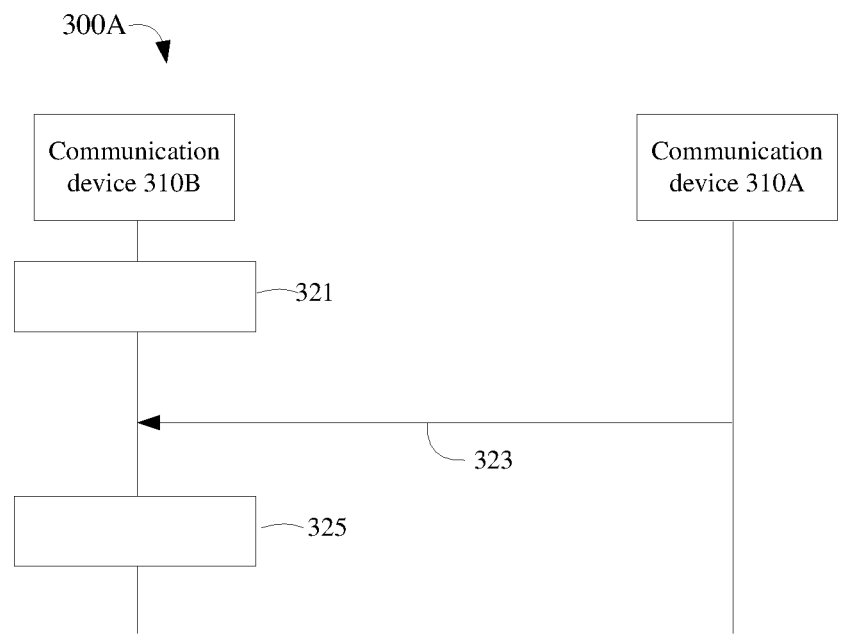
FIG. 3A illustrates a flow chart of an exemplary procedure of performing network registration according to some embodiments of the present disclosure.
Figure 3B:
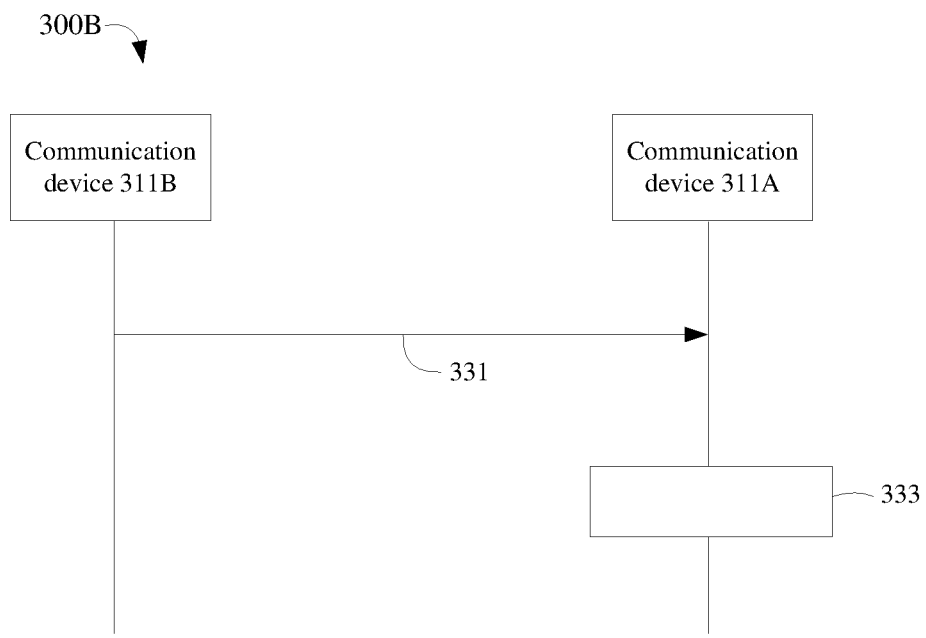
FIG. 3B illustrates a flow chart of an exemplary procedure of performing network registration according to some embodiments of the present disclosure.
Figure 3C:
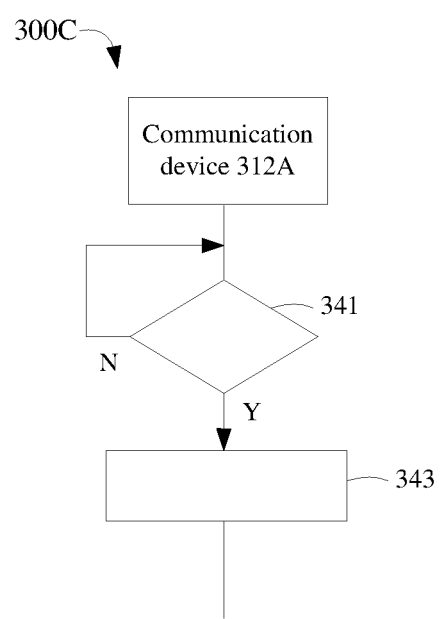
FIG. 3C illustrates a flow chart of an exemplary procedure of performing network registration according to some embodiments of the present disclosure.
Figure 3D:
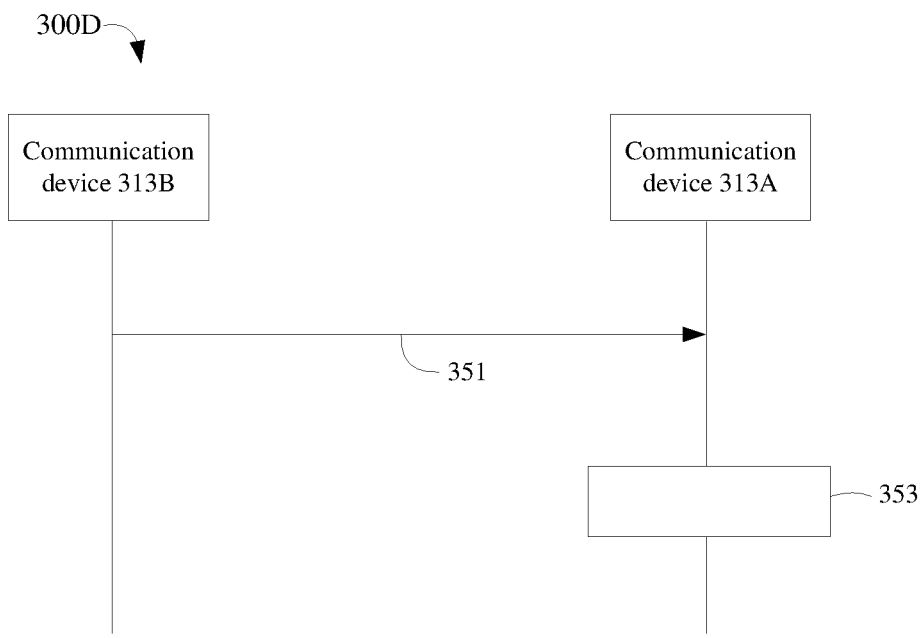
FIG. 3D illustrates a flow chart of an exemplary procedure of performing a periodic registration update according to some embodiments of the present disclosure.
Figure 3E:
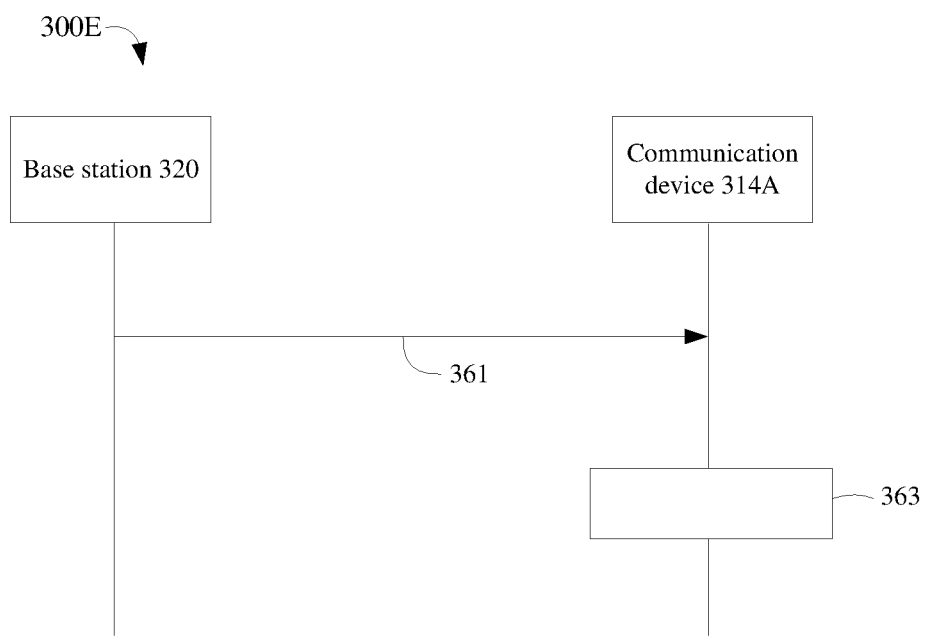
FIG. 3E illustrates a flow chart of an exemplary procedure of performing a periodic registration update according to some embodiments of the present disclosure.

FIGS. 3A-3E illustrate exemplary procedures of performing network registration according to some embodiments of the present disclosure. FIGS. 3A and 3B describe exemplary procedures for performing a registration area update. FIG. 3C describes a new condition for performing a registration procedure. FIGS. 3D and 3E describe exemplary procedures for performing a periodic registration update.

FIG. 3A illustrates a flow chart of an exemplary procedure 300A of performing network registration for a communication device according to some embodiments of the present disclosure.

In some examples, the communication device 310A may function as the communication device 110A in FIG. 1, or the communication device 210 in FIG. 2. The communication device 310B may function as the communication device 110B in FIG. 1, or the communication device 210 in FIG. 2.

Referring to FIG. 3A, the communication device 310B may be registered with a network (not shown in FIG. 3A), and may receive services from the network via a base station or a relay communication device (not shown in FIG. 3A) which is in the coverage of the base station. The base station may be hereinafter referred to as "the last serving cell." The communication device 310B may move out of the coverage of the base station or the relay communication device. The communication device 310B may discover a new relay communication device (e.g., communication device 310A), and may switch from the last serving cell to the communication device 310A.

In operation 321, prior to or when the communication device 310B switches to the communication device 310A, the communication device 310B may store registration area information (e.g., tracking area) of the last serving cell at the communication device 310B (e.g., in its memory).

In operation 323, during or after a connection establishment procedure between the communication device 310A and the communication device 310B, the communication device 310A may transmit registration area (e.g., tracking area) information of the serving cell of the communication device 310A (hereinafter, "current serving cell") to the communication device 310B. In some embodiments of the present disclosure, the registration area information may be transmitted via an Access Stratum (AS) layer message. In some embodiments of the present disclosure, the registration area information may be broadcast in, for example, a System Information Block 1 (SIB1) message by the serving cell.

In operation 325, the communication device 310B may determine whether to perform a registration procedure based on the registration area information of the last serving cell and the registration area information of the current serving cell.

In some embodiments of the present disclosure, the communication device 310B may determine whether the registration area information of the current serving cell matches the registration area information of the last serving cell. When the registration area information of the current serving cell does not match the registration area information of the last serving cell, the communication device 310B may perform a registration procedure with the network. In some embodiments of the present disclosure, the communication device 310B may further replace the registration area information of the last serving cell with that of the current serving cell. When the registration area information of the current serving cell matches the registration area information of the last serving cell, the communication device 310B may not perform the registration procedure.

For example, the registration area information of the current serving cell may indicate a tracking area A identified by a TAC #1, and the registration area information of the last serving cell may indicate a tracking area B identified by a TAC #2. The communication device 310B may determine whether the registration area information of the current serving cell matches the registration area information of the last serving cell by determine whether TAC #1 is the same as TAC #2. If TAC #1 is the same as (e.g., equals to) TAC #2, the communication device 310B may not perform the registration procedure; and if not, the communication device 310B may perform the registration procedure.

In some embodiments of the present disclosure, the registration procedure performed by the communication device 310B is similar to the one described above with respect to FIG. 2, except that the messages between the communication device 310B and the corresponding base station are relayed by the communication device 310A.

FIG. 3B illustrates a flow chart of an exemplary procedure 300B of performing network registration for a communication device according to some embodiments of the present disclosure.

In some examples, the communication device 311A may function as the communication device 110A in FIG. 1, or the communication device 210 in FIG. 2. The communication device 311B may function as the communication device 110B in FIG. 1, or the communication device 210 in FIG. 2.

Referring to FIG. 3B, the communication device 311B may be registered with a network (not shown in FIG. 3B), and may receive services from the network via a base station or a serving cell. The communication device 311B may move out of the serving cell (hereinafter, "last serving cell" or "previous serving cell"). The communication device 311B may discover a new relay communication device (e.g., communication device 311A), and may switch from the last serving cell to the communication device 311A.

In operation 331, during or after a connection establishment procedure between the communication device 311A and the communication device 311B, the communication device 311B may transmit registration information to the communication device 311A. In some embodiments of the present disclosure, the registration information may be transmitted via an Access Stratum (AS) layer message. In some embodiments of the present disclosure, the registration information may include registration area (e.g., tracking area) information of the last serving cell. In some embodiments of the present disclosure, the registration information may include an identity of the communication device 311B. The identity of a communication device may be a UE ID.

In operation 333, the communication device 311A may determine whether to perform a registration procedure for the communication device 311B based on the registration information from the communication device 311B.

In some embodiments of the present disclosure, the communication device 311A may determine whether the registration information from the communication device 311B matches the registration information of a serving cell of the communication device 311A. The registration information of the serving cell of the communication device 311A (hereinafter, "current serving cell") may indicate a tracking area of the current serving cell.

When the registration area information from the communication device 311B matches the registration information of the current serving cell, the communication device 311A may not perform a registration procedure for the communication device 311B. When the registration area information from the communication device 311B does not match the registration information of the current serving cell, the communication device 311A may perform a registration procedure for the communication device 311B.

In some embodiments of the present disclosure, when the registration area information from the communication device 311B does not match the registration information of the current serving cell, the communication device 311A may transmit the registration information of the current serving cell to the communication device 311B. The communication device 311B may store the registration information of the current serving cell in, for example, its memory.

For example, the registration area information of the current serving cell may indicate a tracking area A identified a TAC #1, and the registration area information of the last serving cell may indicate a tracking area B identified a TAC #2. The communication device 311A may determine whether the registration area information of the current serving cell matches the registration area information of the last serving cell by determine whether TAC #1 is the same as TAC #2. If TAC #1 is the same as (e.g., equals to) TAC #2, the communication device 311A may not perform the registration procedure for the communication device 311B; and if not, the communication device 311A may perform the registration procedure for the communication device 311B.

In some embodiments of the present disclosure, the registration procedure performed by the communication device 311A for the communication device 311B is similar to the one described above with respect to FIG. 2. In particular, since the communication device 311A transmits the registration request message for the communication device 311B, the registration request message transmitted by the communication device 311A may include the identity of the communication device 311B, which is in an idle mode. In some embodiments of the present disclosure, the registration request message may further include at least one other idle child communication device of the communication device 311A. In some embodiments of the present disclosure, the registration request message may be transmitted in Non-Access Stratum (NAS) signaling included in a Radio Resource Control (RRC) message.

For example, the communication device 311A may have two child communication devices that are in an idle mode, for example, one is the communication device 311B, and the other is communication device 311C (now shown in FIG. 3B). In some embodiments of the present disclosure, the communication device 311A may transmit a registration request message including only the identity of the communication device 311B to the network via a corresponding base station. In some other embodiments of the present disclosure, the communication device 311A may transmit a registration request including the identities of both the communication device 311B and the communication device 311C to the network via the serving base station of the communication device 311A.

FIG. 3C illustrates a flow chart of an exemplary procedure 300C of performing network registration for a communication device according to some embodiments of the present disclosure.

In some examples, the communication device 312A may function as the communication device 110A in FIG. 1, or the communication device 210 in FIG. 2.

Referring to FIG. 3C, the communication device 312A may be registered with a network (not shown in FIG. 3C), and may receive services from the network via a base station or a serving cell. The communication device 312A may have at least one child node. The at least one child node may communicate with the base station or the network via the communication device 312A.

Under certain circumstances, the link between the communication device 312A and its child nodes (e.g., communication device 312B, which is not shown in FIG. 3C) may fail. The number of the child nodes of the communication device 312A may change from, for example, "N" to "N−1." The definition of the link failure between a remote communication device and a relay communication device are defined in 3GPP specifications.

Under certain circumstances, a communication device (e.g., communication device 312D, which is not shown in FIG. 3C) may establish a link to the communication device 312A, and become a new child node of the communication device 312A. The number of the child nodes of the communication device 312A may change from, for example, "N" to "N+1."

In operation 341, the communication device 312A may determine whether is a trigger condition is met. The trigger condition may be a change in the number of child nodes of the communication device 312A. In some embodiments of the present disclosure, the trigger condition may be a change in the number of child nodes of the communication device 312A that are in an idle mode (idle child nodes).

If it is determined that the number of idle child nodes is changed, the communication device 312A may perform, in operation 343, a registration procedure for its child nodes. Otherwise, if it is determined that the number of idle child nodes is not changed, the communication device 312A may not perform a registration procedure for its child nodes.

In some embodiments of the present disclosure, the registration procedure performed by the communication device 312A for its child nodes is similar to the one described above with respect to FIG. 2, except that the communication device 312A transmits the registration request message for its child nodes, and the registration request message may include the identity of at least one idle child node of the communication device 312A. In some embodiments of the present disclosure, the at least one idle child node of the communication device 312A may include all idle child nodes of the communication device 312A. In some embodiments of the present disclosure, the at least one idle child node of the communication device 312A may include some of idle child nodes of the communication device 312A.

As mentioned above, to manage the reachability of a communication device, the network may configure a communication device to periodically perform a registration procedure (i.e., "periodic registration update"). For example, the network (e.g., an AMF) may configure a communication device with a periodic registration timer during a registration procedure. A communication device may perform a periodic registration update by starting the periodic registration timer when, for example, the communication device enters into an idle mode, and performing a registration procedure in response to an expiry of the periodic registration timer. The registration procedure performed by the communication device is the same as the one described above with respect to FIG. 2.

A communication device (child communication device) accessing a network via another communication device (relay communication device) may also need to periodically register with the network. In some embodiments of the present disclosure, the child communication device itself may perform a periodic registration update by periodically performing a registration procedure as described above with respect to the exemplary procedure 200 in FIG. 2. In some other embodiments of the present disclosure, the relay communication device may perform the periodic registration update on behalf of its child communication device(s). The procedure of performing a periodic registration update for a child communication device will be described in detail in the following text in combination with the appended drawings.

FIG. 3D illustrates a flow chart of an exemplary procedure 300D of performing a periodic registration update for a communication device according to some embodiments of the present disclosure.

In some examples, the communication device 313A may function as the communication device 110A in FIG. 1, or the communication device 210 in FIG. 2. The communication device 313B may function as the communication device 110B in FIG. 1, or the communication device 210 in FIG. 2.

Referring to FIG. 3D, the communication device 313B may be registered with a network (not shown in FIG. 3D), and may receive services from the network via the communication device 313A. In other words, the communication device 313B is a child node of the communication device 313A.

In operation 351, the communication device 313B may transmit timer information regarding a periodic registration timer (e.g., periodic timer A) to the communication device 313A. In some embodiments of the present disclosure, in the case that the periodic timer A is running at the communication device 313B, the communication device 313B may stop the periodic timer A in response to transmitting the timer information.

In operation 353, the communication device 313A may start a periodic registration timer (e.g., periodic timer B) based on the received timer information. The communication device 313A may perform a registration procedure for the communication device 313B in response to an expiry of the periodic timer B. The communication device 313A may restart the periodic timer B in response to the expiry of the periodic timer B.

In some embodiments of the present disclosure, the timer information may be transmitted to the communication device 313A during or after a connection establishment procedure between the communication device 313A and the communication device 313B. For example, the timer information may be transmitted via an AS layer message.

In some embodiments of the present disclosure, the timer information may include a time interval of the periodic timer A and an amount of elapsed time of the periodic timer A. Prior to starting the periodic timer B, the communication device 313A may start a timer (e.g., timer C) in response to receiving the timer information. The timer C may have a time duration equal to the time interval of the periodic timer A minus the amount of elapsed time of the periodic timer A. The communication device 313A may start the periodic timer B in response to the expiry of the timer C. The periodic timer B may have a time interval equal to the time interval of the periodic timer A.

In some embodiments of the present disclosure, the registration procedure performed by the communication device 313A for the communication device 313B is similar to the one described above with respect to FIG. 2, except that the communication device 313A transmits the registration request for its child communication device (e.g., the communication device 313B), and the registration request message may include registration information indicating the identity of at least one child communication device of the communication device 313A, which is in an idle mode. In some embodiments of the present disclosure, the at least one idle child communication device may include only the communication device 313B, which is in an idle mode. In some embodiments of the present disclosure, the at least one idle child communication device may include the communication device 313B and one or more other idle child communication devices. For example, the at least one child communication device may include all idle child communication devices of the communication device 313A.

In some embodiments of the present disclosure, in addition to receiving timer information from the communication device 313B, the communication device 313A may receive timer information from one or more other child communication devices (if any). In some embodiments, the communication device 313A may receive timer information from all of its child communication devices. In some embodiments of the present disclosure, the communication device 313A may receive timer information from some of its child communication devices. Each timer information from a respective child communication device may include a respective time interval, which corresponds to a respective periodic registration timer at the respective child communication device.

For example, the communication device 313B may transmit the timer interval (e.g., TI #A) of the periodic timer A to the communication device 313A. A communication device 313C (not shown in FIG. 3D) is a child communication device of the communication device 313A, and may be configured with a periodic registration timer (e.g., periodic timer D) having a timer interval (e.g., TI #D). The communication device 313C may transmit the TI #D to communication device 313A.

After receiving the timer intervals from its child communication devices, the communication device 313A may start, in operation 353, the periodic timer B based on received timer intervals. In some embodiments, the communication device 313A may determine a minimum value of the timer intervals of the corresponding periodic registration timers of the child communication devices. The communication device 313A may set the time interval of the periodic timer B as the minimum value. For example, the communication device 313A may set the time interval of the periodic timer B as the minimum value of TI #A and TI #D.

In some embodiments of the present disclosure, the communication device 313A may perform, in operation 353, the registration procedure for at least one child communication device that has transmitted timer information thereto (e.g., the communication device 313B and communication device 313C) in response to the expiry of the periodic timer B. For example, the communication device 313A may perform a registration procedure similar to the one described above with respect to FIG. 2, except that the registration request transmitted by the communication device 313A for the at least one child communication device (e.g., the communication device 313B and communication device 313C) may include registration information indicating the identity of all or some of the at least one child communication device, which is in an idle mode.

FIG. 3E illustrates a flow chart of an exemplary procedure 300E of performing a periodic registration update for a communication device according to some embodiments of the present disclosure.

In some examples, the communication device 314A may function as the communication device 110A in FIG. 1, or the communication device 210 in FIG. 2. The BS 320 may function as the BS 120 in FIG. 1, or the BS 220 in FIG. 2.

Referring to FIG. 3E, the communication device 314A may be registered with a network (not shown in FIG. 3E), and may receive services from the network via the BS 320.

In operation 361, the communication device 314A may receive a configuration message from the BS 320. In some embodiments of the present disclosure, the configuration message may indicate a timer interval of a period timer (e.g., periodic registration timer) for at least one child communication device of the communication device 314A. The configuration message may be transmitted in a broadcast message or a dedicated signaling from the BS 320.

In operation 363, the communication device 314A may start a period timer for at least one child communication device of the communication device 314A, which is in an idle mode. In some embodiments of the present disclosure, the communication device 314A may start the period timer when a child communication device of the communication device 314A enters into an idle mode.

In some embodiments of the present disclosure, the communication device 313A may perform a registration procedure for at least one idle child communication device in response to the expiry of the period timer. For example, the communication device 314A may perform a registration procedure similar to the one described above with respect to FIG. 2, except that the registration request transmitted by the communication device 314A for the at least one idle child communication device may include registration information indicating the identity of the at least one idle child communication device.

It should be appreciated by persons skilled in the art that some of the operations in exemplary procedures 300A-300E may be eliminated, without departing from the spirit and scope of the disclosure.

A RAN-based Notification Area (RNA) may allow base station to know the rough location of a UE that is in an inactive mode (inactive UE). The RNA may include one or more cells or one or more RAN areas, and may be configured by a RAN node (e.g., a base station) to a UE using, for example, dedicated signaling. The RAN node may trigger a paging procedure for an inactive UE within the UE's RNA when the RAN wants to exchange data or control signaling with the inactive UE. Therefore, it is important for the RAN to be aware of the inactive UE moving out of the configured RNA. Thus, the UE may perform a RNA update when moving out of the configured RNA (that is, triggered by RNA change). In addition, the UE may be configured to perform a RNA update periodically (hereinafter, "periodic RNA update").

Figure 4:
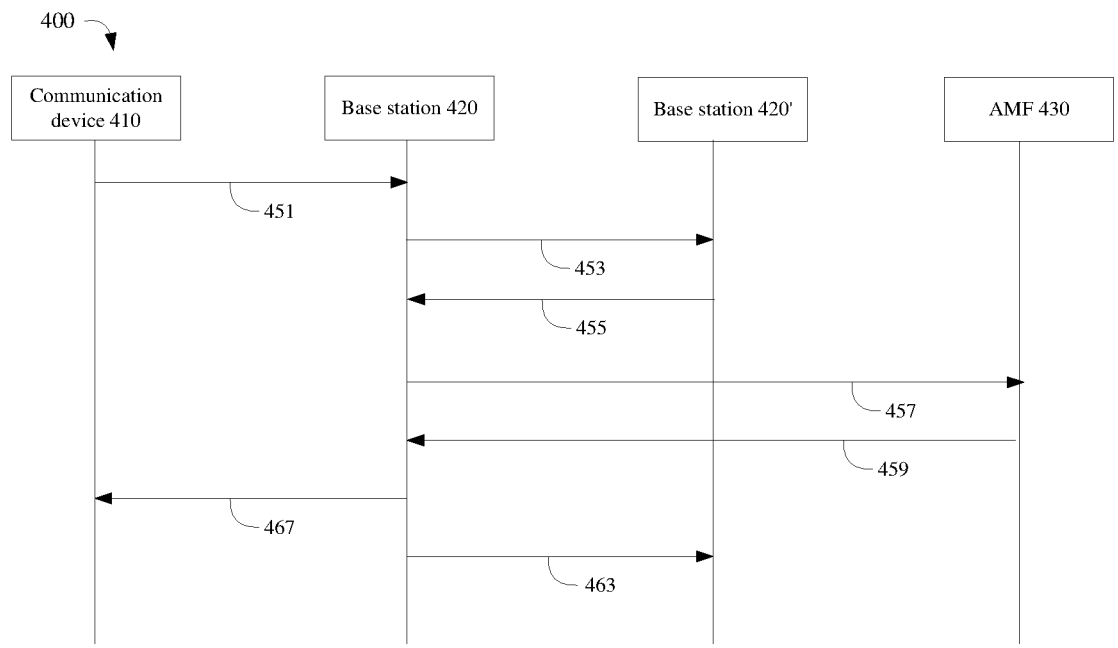
FIG. 4 illustrates a flow chart of an exemplary procedure of performing RAN-Based Notification Area update according to some embodiments of the present disclosure.

FIG. 4 illustrates a flow chart of an exemplary procedure 400 of performing a RNA update for a communication device according to some embodiments of the present disclosure. The exemplary procedure 400 is applicable to the above two types of RNA update, i.e., a RNA update triggered by RNA change and a periodic RNA update, and other types of a RNA update.

Referring to FIG. 4, at the beginning, communication device 410 may communicate with a base station (e.g., BS 420'). The communication device 410 may perform a RNA update procedure when it moves out of the BS 420' (i.e., lasting serving base station), and may switch to a new base station (e.g., BS 420). In some examples, the communication device 410 may function as the communication device 110A or the communication device 110B in FIG. 1. The BS 420 and BS 420' may function as the BS 120 in FIG. 1.

In operation 451, the communication device 410 may transmit an RRC connection resume request to a new base station (e.g., the BS 420). In some embodiments, the resume request may include a cause value indicating a RNA update. In some embodiments, the resume request may include the identity of the communication device 410. The identity of the communication device 410 may be a resume ID configured by the last serving base station (e.g., the BS 420') in a RRC release message. The resume ID may include information regarding the last serving base station (e.g., the BS 420'). In some embodiments, a resume ID may include an Inactive-Radio Network Temporary Identifier (I-RNTI).

In operation 453, the BS 420 may transmit a request for acquiring UE context of the communication device 410 to the lasting serving base station (e.g., BS 420') of the communication device 410. In some embodiments, the request for acquiring UE context may include the identity of the communication device 410. In some embodiments, the request for acquiring UE context may include the cause value received from the communication device 410. In operation 455, the BS 420' may transmit the UE context of the communication device 410 to the BS 420.

In operations 457 and 459, the BS 420 may perform a path switch procedure for the communication device 410. In operation 457, the BS 420 may transmit a path switch request for the communication device 410 to the core network (e.g., AMF 430). In operation 459, the AMF 430 may transmit a path switch request response to the BS 420. The path switch request response may include the identity of the communication device 410.

In operation 461, the BS 420 may transmit a RNA update acknowledge message to the communication device 410. The acknowledge message may include the identity of the communication device 410. In operation 463, the BS 420 may transmit a UE context release message to the BS 420'. The release message may include the identity of the communication device 410.

It should be appreciated by persons skilled in the art that some of the operations in exemplary procedures 400 may be eliminated, without departing from the spirit and scope of the disclosure.

A communication device (child communication device) accessing a base station via another communication device (relay communication device) may also need to perform a RNA update. In some embodiments of the present disclosure, the child communication device itself may perform a RNA update procedure similar to the exemplary procedure 400. In some other embodiments of the present disclosure, the relay communication device may perform the RNA update procedure on behalf of the child communication device. The procedure of performing a RNA update for a child communication device will be described in detail in the following text in combination with the appended drawings.

Figure 5A:
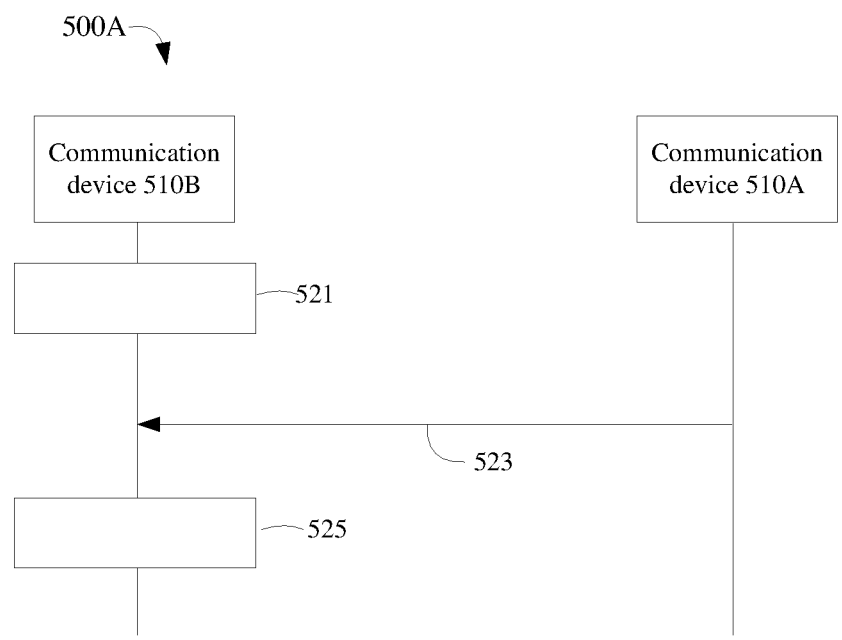
FIG. 5A illustrates a flow chart of an exemplary procedure of performing RAN-Based Notification Area update according to some embodiments of the present disclosure.
Figure 5B:
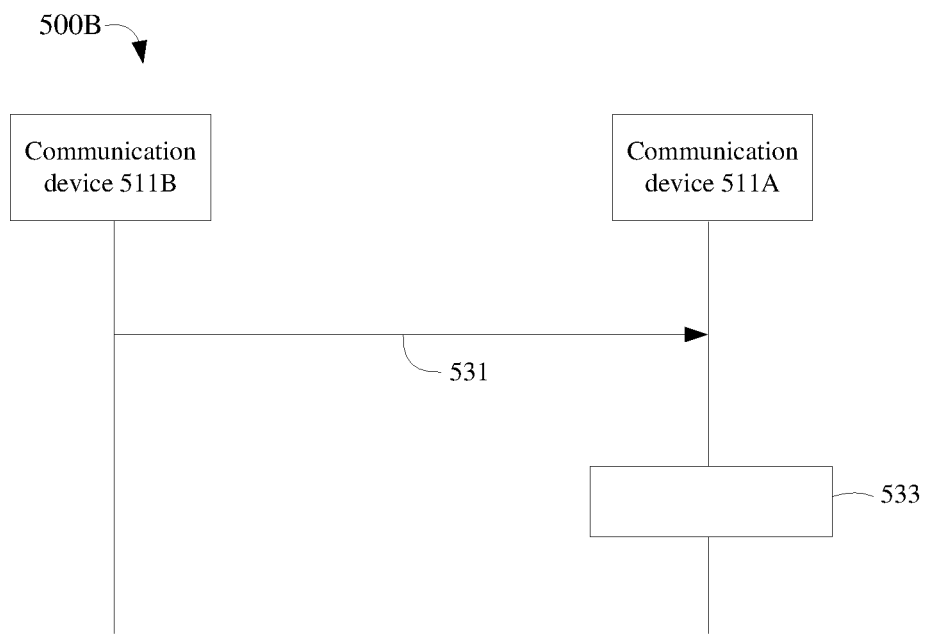
FIG. 5B illustrates a flow chart of an exemplary procedure of performing RAN-Based Notification Area update according to some embodiments of the present disclosure.
Figure 5C:
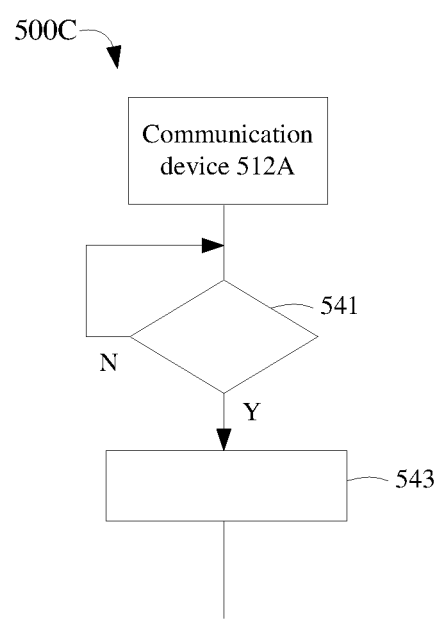
FIG. 5C illustrates a flow chart of an exemplary procedure of performing RAN-Based Notification Area update according to some embodiments of the present disclosure.
Figure 5D:
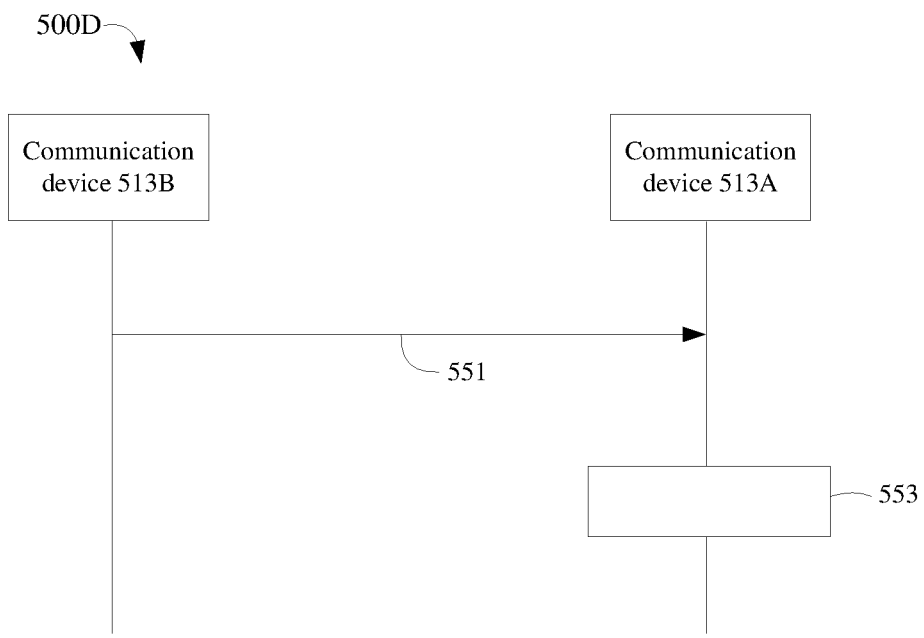
FIG. 5D illustrates a flow chart of an exemplary procedure of performing periodic RAN-Based Notification Area update according to some embodiments of the present disclosure.
Figure 5E:
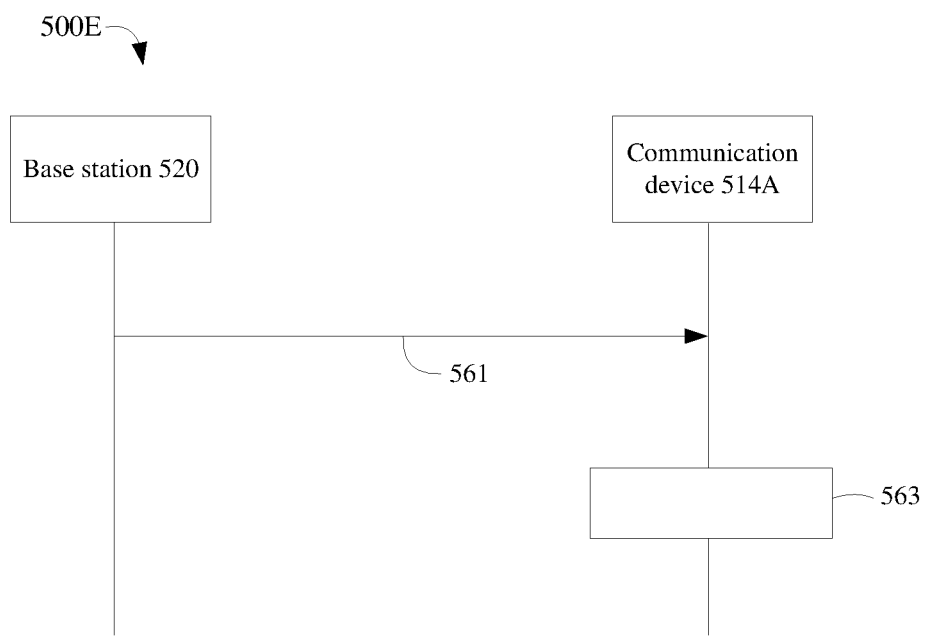
FIG. 5E illustrates a flow chart of an exemplary procedure of performing periodic RAN-Based Notification Area update according to some embodiments of the present disclosure.

FIGS. 5A-5E illustrate exemplary procedures of performing a RNA update according to some embodiments of the present disclosure. FIGS. 5A and 5B describe exemplary procedures for performing a RNA update triggered by RNA change. FIG. 5C describes a new condition for performing a RNA update procedure. FIGS. 5D and 5E describe exemplary procedures for performing a periodic RNA update.

FIG. 5A illustrates a flow chart of an exemplary procedure 500A of performing a RNA update for a communication device according to some embodiments of the present disclosure.

In some examples, the communication device 510A may function as the communication device 110A in FIG. 1, or the communication device 410 in FIG. 4. The communication device 510B may function as the communication device 110B in FIG. 1, or the communication device 410 in FIG. 4.

Referring to FIG. 5A, the communication device 510B may access a base station or a serving cell via the communication device 510A. The communication device 510B may move out of the serving cell (hereinafter, "last serving cell" or "previous serving cell"). The communication device 510B may discover a new relay communication device (e.g., communication device 510A), and may switch from the last serving cell to the communication device 510A.

In operation 521, prior to or when the communication device 510B switches to the communication device 510A, the communication device 510B may store RNA information of the last serving cell at the communication device 510B (e.g., in its memory). The RNA information may indicate a list of cells or a list of RAN area IDs, depending on the configuration of the last serving cell. A RAN area may be identified by a RAN area ID. A RAN area ID may include a TAC, and may optionally include a RAN area code. A RAN area may cover one or more cells.

In operation 523, during or after a connection establishment procedure between the communication device 510A and the communication device 510B, the communication device 510A may transmit a message including RNA information of the serving cell of the communication device 510A (hereinafter, "current serving cell") and an ID of the current serving cell to the communication device 510B. The RNA information of the current serving cell may indicate a list of cells or a list of RAN area IDs, depending on the configuration of the current serving cell. In some embodiments of the present disclosure, the message may be an Access Stratum (AS) layer message.

In operation 525, the communication device 510B may determine whether to perform a RNA update procedure based on the RNA information of the last serving cell stored at the communication device 510B and the message received from the communication device 510A.

In some embodiments of the present disclosure, the communication device 510B may determine whether the ID of the current serving cell is included in the RNA information of the last serving cell. When the ID of the current serving cell is not included in the RNA information of the last serving cell, the communication device 510B may perform a RNA update procedure. In some embodiments of the present disclosure, the communication device 510B may further replace the stored RNA information of the last serving cell with that of the current serving cell received from the communication device 510A. When the ID of the current serving cell is included in the RNA information of the last serving cell, the communication device 510B may not perform a RNA update procedure.

In some embodiments of the present disclosure, the communication device 510B may determine whether the RNA information of the last serving cell is the same as the RNA information of the current serving cell. When the RNA information of the last serving cell is different from that of the current serving cell, the communication device 510B may replace the stored RNA information of the last serving cell with that of the current serving cell received from the communication device 510A.

In some embodiments of the present disclosure, the RNA update procedure performed by the communication device 510B is similar to the one described above with respect to FIG. 4, except that the messages between the communication device 510B and the corresponding base station are relayed by the communication device 510A.

FIG. 5B illustrates a flow chart of an exemplary procedure 500B of performing a RNA update for a communication device according to some embodiments of the present disclosure.

In some examples, the communication device 511A may function as the communication device 110A in FIG. 1, or the communication device 410 in FIG. 4. The communication device 511B may function as the communication device 110B in FIG. 1, or the communication device 410 in FIG. 4.

Referring to FIG. 5B, the communication device 511B may access a base station or a serving cell via the communication device 510A. The communication device 511B may move out of the serving cell (hereinafter, "last serving cell" or "previous serving cell"). The communication device 511B may discover a new relay communication device (e.g., communication device 511A), and may switch from the last serving cell to the communication device 511A.

In operation 531, during or after a connection establishment procedure between the communication device 511A and the communication device 511B, the communication device 511B may transmit a message including RNA information of the last serving cell and the identity of the communication device 511B to the communication device 511A. The identity of a communication device may be a resume ID (e.g., I-RNTI). In some embodiments of the present disclosure, the message may be an Access Stratum (AS) layer message.

In operation 533, the communication device 511A may determine whether to perform a RNA update procedure for the communication device 511B based on the message (e.g., the RNA information of the last serving cell) from the communication device 511B. The RNA information of the last serving cell may indicate a list of cells or a list of RAN area IDs, depending on the configuration of the last serving cell.

In some embodiments of the present disclosure, the communication device 511A may determine whether the RNA information of the last serving cell from the communication device 511B matches the RNA information of a serving cell of the communication device 511A (hereinafter, "current serving cell"). The RNA information of the current serving cell may indicate a list of cells or a list of RAN area IDs, depending on the configuration of the current serving cell.

In some embodiments of the present disclosure, the RNA information of the last serving cell may indicate a list of cells. The communication device 511A may determine whether the RNA information of the last serving cell from the communication device 511B matches the RNA information of the current serving cell of the communication device 511A by determining whether the list of cells include the current serving cell (e.g., the serving cell of the communication device 511A). When the list of cells does not include the current serving cell, the RNA information of the last serving cell does not match the RNA information of the current serving cell; otherwise, the RNA information of the last serving cell matches the RNA information of the current serving cell.

In some embodiments of the present disclosure, the RNA information of the last serving cell may indicate a list of RAN areas. The communication device 511A may determine whether the RNA information of the last serving cell from the communication device 511B matches the RNA information of the current serving cell of the communication device 511A by determining whether the list of RAN areas include the current serving cell (e.g., the serving cell of the communication device 511A). When the list of RAN areas does not include the current serving cell, the RNA information of the last serving cell does not match the RNA information of the current serving cell; otherwise, the RNA information of the last serving cell matches the RNA information of the current serving cell.

When the RNA information of the last serving cell from the communication device 511B matches the RNA information of the current serving cell of the communication device 511A, the communication device 511A may not perform a RNA update procedure for the communication device 511B. When the RNA information of the last serving cell from the communication device 511B does not match the RNA information of the current serving cell of the communication device 511A, the communication device 511A may perform a RNA update procedure for the communication device 511B.

In some embodiments of the present disclosure, the RNA update procedure performed by the communication device 511A for the communication device 511B is similar to the one described above with respect to FIG. 4, except that the communication device 511A transmits the resume request for its child communication device (e.g., the communication device 511B) to the serving base station, and the resume request may include the identity of at least one child communication device of the communication device 511A, which is in an inactive mode. In some embodiments of the present disclosure, the resume request may be transmitted by a Radio Resource Control (RRC) message.

In some embodiments of the present disclosure, the at least one inactive child communication device may include only the communication device 511B, which is in an inactive mode. For example, the resume request may include the resume ID (e.g., I-RNTI) of the communication device 511B. In some embodiments of the present disclosure, the at least one inactive child communication device may include all or a part of the inactive child communication devices of the communication device 511A. For example, the communication device 511A may have two inactive child communication devices; one is the communication device 511B, and the other is communication device 511C (now shown in FIG. 5B). The resume request may include the resume ID (e.g., I-RNTI) of the communication device 511B and the resume ID (e.g., I-RNTI) of the communication device 511C.

In some embodiments of the present disclosure, the communication device 511A may determine, in operation 533, whether the RNA information of the last serving cell from the communication device 511B is different from the RNA information of the current serving cell of the communication device 511A. When the RNA information of the last serving cell is different from the RNA information of the current serving cell, the communication device 511A may transmit the RNA information of the current serving cell to the communication device 511B. The communication device 511B may store the RNA information of the current serving cell in, for example, its memory.

For example, the RNA information of the last serving cell may indicate a list of cells including cell #1 to cell #4, and the RNA information of the current serving cell may indicate a list of cells including cell #3 to cell #6. In another example, the RNA information of the last serving cell may indicate a list of cells including cell #1 to cell #2, and the RNA information of the current serving cell may indicate a list of cells including cell #3 to cell #6. In the above examples, the communication device 511A may determine that the RNA information of the last serving cell is different from that of the current serving cell, and may transmit the RNA information of the current serving cell (e.g., the list of cells including cell #3 to cell #6) to the communication device 511B.

FIG. 5C illustrates a flow chart of an exemplary procedure 500C of performing a RNA update for a communication device according to some embodiments of the present disclosure.

In some examples, the communication device 512A may function as the communication device 110A in FIG. 1, or the communication device 410 in FIG. 4.

Referring to FIG. 5C, the communication device 512A may be registered with a network (not shown in FIG. 5C), and may receive services from the network via a base station or a serving cell. The communication device 512A may have at least one child node. The at least one child node may communicate with the base station or the network via the communication device 512A.

Under certain circumstances, the link between the communication device 512A and its child nodes (e.g., communication device 512B, which is not shown in FIG. 5C) may fail. The number of the child nodes of the communication device 512A may change from, for example, "N" to "N−1." The definition of the link failure between a remote communication device and a relay communication device are defined in 3GPP specifications.

Under certain circumstances, a communication device (e.g., communication device 512D, which is not shown in FIG. 5C) may establish a link to the communication device 512A, and become a new child node of the communication device 512A. The number of the child nodes of the communication device 512A may change from, for example, "N" to "N+1."

In operation 541, the communication device 512A may determine whether is a trigger condition is met. The trigger condition may be a change in the number of child nodes of the communication device 512A. In some embodiments of the present disclosure, the trigger condition may be a change in the number of child nodes of the communication device 512A that are in an inactive mode (inactive child nodes).

If it is determined that the number of inactive child nodes is changed, the communication device 512A may perform, in operation 543, a RNA update procedure for its child nodes. Otherwise, if it is determined that the number of inactive child nodes is not changed, the communication device 512A may not perform a RNA update procedure for its child nodes.

In some embodiments of the present disclosure, the RNA update procedure performed by the communication device 512A for its child nodes is similar to the one described above with respect to FIG. 4, except that the communication device 512A transmits the resume request for its child nodes, and the resume request may include the identity of at least one inactive child node of the communication device 512A. In some embodiments of the present disclosure, the at least one inactive child node of the communication device 512A may include all inactive child nodes of the communication device 512A. In some embodiments of the present disclosure, the at least one inactive child node of the communication device 512A may include a part of inactive child nodes of the communication device 512A.

FIG. 5D illustrates a flow chart of an exemplary procedure 500D of performing a periodic RNA update for a communication device according to some embodiments of the present disclosure.

In some examples, the communication device 513A may function as the communication device 110A in FIG. 1, or the communication device 410 in FIG. 4. The communication device 513B may function as the communication device 110B in FIG. 1, or the communication device 410 in FIG. 4.

Referring to FIG. 5D, the communication device 513B may access a base station or a serving cell via the communication device 513A. In other words, the communication device 513B is a child node of the communication device 513A.

In operation 551, the communication device 513B may transmit timer information regarding a periodic RNA update timer (e.g., periodic timer E) to the communication device 513A. In some embodiments of the present disclosure, in the case that the periodic timer E is running at the communication device 513B, the communication device 513B may stop the periodic timer E in response to transmitting the timer information.

In operation 553, the communication device 513A may start a periodic RNA update timer (e.g., periodic timer F) based on the received timer information. The communication device 513A may perform a RNA update procedure for the communication device 513B in response to an expiry of the periodic timer F. The communication device 513B may restart the periodic timer F in response to the expiry of the periodic timer F.

In some embodiments of the present disclosure, the timer information may be transmitted to the communication device 513A during or after a connection establishment procedure between the communication device 513A and the communication device 513B. For example, the timer information may be transmitted via an AS layer message.

In some embodiments of the present disclosure, the timer information may include a time interval of the periodic timer E and an amount of elapsed time of the periodic timer E. Prior to starting the periodic timer F, the communication device 513A may start a timer (e.g., timer G) in response to receiving the timer information. The timer G may have a time duration equal to the time interval of the periodic timer E minus the amount of elapsed time of the periodic timer E. The communication device 513A may start the periodic timer F in response to the expiry of the timer G. The periodic timer F may have a time interval equal to the time interval of the periodic timer E.

In some embodiments of the present disclosure, the RNA update procedure performed by the communication device 513A for the communication device 513B is similar to the one described above with respect to FIG. 4, except that the communication device 513A transmits the resume request for its child communication device (e.g., the communication device 513B), and the resume request may include the identity of at least one child communication device of the communication device 513A, which is in an inactive mode. In some embodiments of the present disclosure, the at least one child communication device may include all of the inactive child communication devices of the communication device 513A. In some embodiments of the present disclosure, the at least one child communication device may include some of the inactive child communication devices of the communication device 513A.

In some embodiments of the present disclosure, in addition to receiving timer information from the communication device 513B, the communication device 513A may receive timer information from one or more other child communication devices (if any). In some embodiments, the communication device 513A may receive timer information from all of its child communication devices. In some embodiments of the present disclosure, the communication device 513A may receive timer information from some of its child communication devices. Each timer information from a respective child communication device may include a respective time interval, which corresponds to a respective periodic RNA update timer at the respective child communication device.

For example, the communication device 513B may transmit the timer interval (e.g., TI #E) of the periodic timer E to the communication device 513A. A communication device 513C (not shown in FIG. 5D) is a child communication device of the communication device 513A, and may be configured with a periodic RNA update timer (e.g., periodic timer H) having a timer interval (e.g., TI #H). The communication device 513C may transmit the TI #H to communication device 513A.

After receiving the timer intervals from its child communication devices, the communication device 513A may start, in operation 553, the periodic timer F based on the received timer intervals. In some embodiments, the communication device 513A may determine a minimum value of the timer intervals of the corresponding periodic RNA update timers of the child communication devices. The communication device 513A may set the time interval of the periodic timer F as the minimum value. For example, the communication device 513A may set the time interval of the periodic timer F as the minimum value of TI #E and TI #H.

In some embodiments of the present disclosure, the communication device 513A may perform, in operation 553, a RNA update procedure for at least one child communication device that has transmitted timer information thereto (e.g., the communication device 513B and communication device 513C) in response to the expiry of the periodic timer F. For example, the communication device 513A may perform a RNA update procedure similar to the one described above with respect to FIG. 4, except that the resume request transmitted by the communication device 513A for the at least one child communication device (e.g., the communication device 513B and communication device 513C) may include the identity of the at least one child communication device, which is in an inactive mode. In some embodiments of the present disclosure, the at least one inactive child communication device may include all of the inactive child communication devices of the communication device 513A. In some embodiments of the present disclosure, the at least one child communication device may include some of the inactive child communication devices of the communication device 513A.

FIG. 5E illustrates a flow chart of an exemplary procedure 500E of performing a periodic RNA update for a communication device according to some embodiments of the present disclosure.

In some examples, the communication device 514A may function as the communication device 110A in FIG. 1, or the communication device 410 in FIG. 4. The BS 520 may function as the BS 120 in FIG. 1, or the BS 420 in FIG. 4.

Referring to FIG. 5E, the communication device 514A may be registered with a network (not shown in FIG. 5E), and may receive services from the network via the BS 520.

In operation 561, the communication device 514A may receive a configuration message from the BS 520. In some embodiments of the present disclosure, the configuration message may indicate a timer interval of a period timer (e.g., periodic RNA update timer) for at least one child communication device of the communication device 514A. The configuration message may be transmitted in a broadcast message or a dedicated signaling from the BS 520.

In operation 563, the communication device 514A may start a period timer for at least one inactive child communication device of the communication device 514A. In some embodiments of the present disclosure, the communication device 514A may start the period timer when a child communication device of the communication device 514A moving out of the RNA configured for the child communication device.

In some embodiments of the present disclosure, the communication device 514A may perform a RNA update procedure for at least one inactive child communication device in response to the expiry of the period timer. For example, the communication device 513A may perform a RNA update procedure similar to the one described above with respect to FIG. 4, except that the resume request transmitted by the communication device 514A for the at least one inactive child communication device may include the identity of the at least one inactive child communication device. In some embodiments of the present disclosure, the at least one inactive child communication device may include all of the inactive child communication devices of the communication device 514A. In some embodiments of the present disclosure, the at least one child communication device may include some of the inactive child communication devices of the communication device 514A.

It should be appreciated by persons skilled in the art that some of the operations in exemplary procedures 500A-500E may be eliminated, without departing from the spirit and scope of the disclosure.

Figure 6:
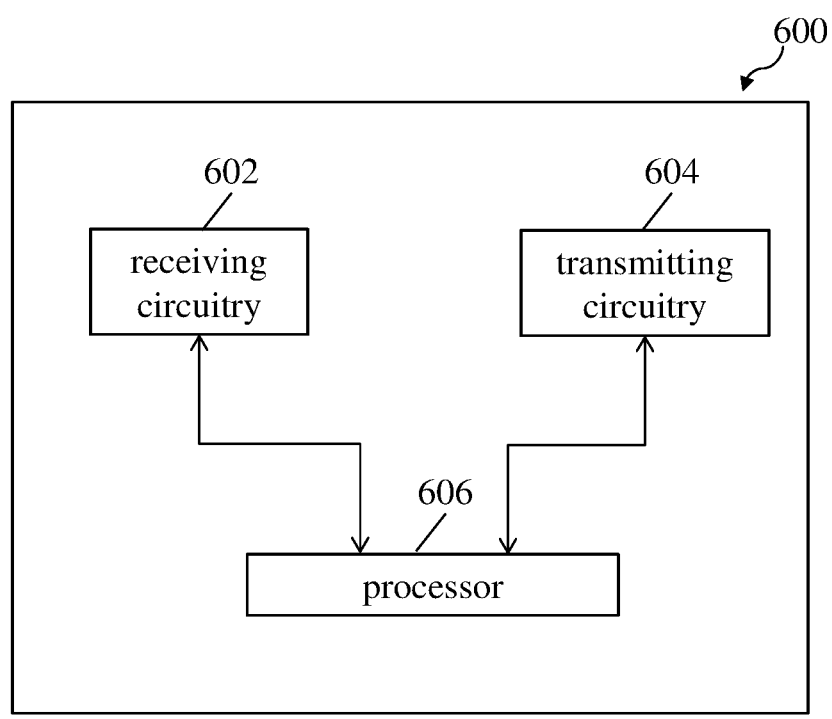
FIG. 6 illustrates an example block diagram of an apparatus according to some embodiments of the present disclosure.

FIG. 6 illustrates an example block diagram of an apparatus 600 according to some embodiments of the present disclosure.

As shown in FIG. 6, the apparatus 600 may include at least one non-transitory computer-readable medium (not illustrated in FIG. 6), a receiving circuitry 602, a transmitting circuitry 604, and a processor 606 coupled to the non-transitory computer-readable medium (not illustrated in FIG. 6), the receiving circuitry 602 and the transmitting circuitry 604. The apparatus 600 may be a communication device (e.g., a UE).

Although in this figure, elements such as processor 606, transmitting circuitry 604, and receiving circuitry 602 are described in the singular, the plural is contemplated unless a limitation to the singular is explicitly stated. In some embodiments of the present disclosure, the receiving circuitry 602 and the transmitting circuitry 604 are combined into a single device, such as a transceiver. In certain embodiments of the present disclosure, the apparatus 600 may further include an input device, a memory, and/or other components.

In some embodiments of the present disclosure, the non-transitory computer-readable medium may have stored thereon computer-executable instructions to cause a processor to implement the method with respect to the communication device as described above. For example, the computer-executable instructions, when executed, cause the processor 606 to interact with receiving circuitry 602 and transmitting circuitry 604, so as to perform the steps with respect to the communication devices or UEs depicted in FIGS. 1, 2, 3A-3E, 4, and 5A-5E.

In some embodiments of the present disclosure, the non-transitory computer-readable medium may have stored thereon computer-executable instructions to cause a processor to implement the method with respect to the base station as described above. For example, the computer-executable instructions, when executed, cause the processor 606 to interact with receiving circuitry 602 and transmitting circuitry 604, so as to perform the steps with respect to the base stations depicted in FIGS. 1, 2, 3A-3E, 4, and 5A-5E.

In some embodiments of the present disclosure, the non-transitory computer-readable medium may have stored thereon computer-executable instructions to cause a processor to implement the method with respect to the network entity as described above. For example, the computer-executable instructions, when executed, cause the processor 606 to interact with receiving circuitry 602 and transmitting circuitry 604, so as to perform the steps with respect to the network entity (e.g., AMF) depicted in FIGS. 1, 2, 3A-3E, 4, and 5A-5E.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, a register, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

The invention claimed is:

1. A method at a user equipment (UE), the method comprising:
   storing first registration information of a last serving cell;
   receiving, from a first communication device, a message comprising second registration information of a serving cell of the first communication device, wherein the serving cell of the first communication device comprises a serving cell of a base station, and the base station is separate from the first communication device; and
   determining whether to perform a registration procedure based on the first registration information and the second registration information.

2. The method of claim 1, further comprising:
   performing the registration procedure when the second registration information does not match the first registration information.

3. The method of claim 2, further comprising determining whether the second registration information matches the first registration information.

4. The method of claim 1, wherein the first registration information indicates a first tracking area code of the last serving cell, and the second registration information indicates a second tracking area code of the serving cell of the first communication device.

5. The method of claim 4, further comprising determining whether the second registration information matches the first registration information by determining whether a first tracking area associated with the first registration information matches a second tracking area associated with the second registration information.

6. A user equipment (UE), comprising:
   at least one memory; and
   at least one processor coupled with the at least one memory and configured to cause the UE to:
   store first registration information of a last serving cell;
   receive, from a first communication device, a message comprising second registration information of a serving cell of the first communication device, wherein the serving cell of the first communication device comprises a serving cell of a base station, and the base station is separate from the first communication device; and
   determine whether to perform a registration procedure based on the first registration information and the second registration information.

7. The UE of claim 6, wherein the at least one processor is configured to cause the UE to:
   perform the registration procedure when the second registration information does not match the first registration information.

8. The UE of claim 7, wherein the at least one processor is configured to cause the UE to determine whether the second registration information matches the first registration information.

9. The UE of claim 8, wherein the at least one processor is configured to cause the UE to determine whether the second registration information matches the first registration information by determining whether a first tracking area associated with the first registration information matches a second tracking area associated with the second registration information.

10. The UE of claim 6, wherein the first registration information indicates a first tracking area code of the last serving cell, and the second registration information indicates a second tracking area code of the serving cell of the first communication device.

11. A processor for wireless communication, comprising:
    at least one controller coupled with at least one memory and configured to cause the processor to:
    store first registration information of a last serving cell;

receive, from a first communication device, a message comprising second registration information of a serving cell of the first communication device, wherein the serving cell of the first communication device comprises a serving cell of a base station, and the base station is separate from the first communication device; and determine whether to perform a registration procedure based on the first registration information and the second registration information.

12. The processor of claim 11, wherein the at least one controller is configured to cause the processor to:

perform the registration procedure when the second registration information does not match the first registration information.

13. The processor of claim 12, wherein the at least one controller is configured to cause the processor to determine whether the second registration information matches the first registration information.

14. The processor of claim 13, wherein the at least one controller is configured to cause the processor to determine whether the second registration information matches the first registration information by determining whether a first tracking area associated with the first registration information matches a second tracking area associated with the second registration information.

15. The processor of claim 11, wherein the first registration information indicates a first tracking area code of the last serving cell, and the second registration information indicates a second tracking area code of the serving cell of the first communication device.

* * * * *